Oct. 2, 1945.   L. P. TAKAC, JR   2,386,014
ADJUSTABLE DOG STOP RELEASE FOR TURRET LATHES
Filed May 25, 1944
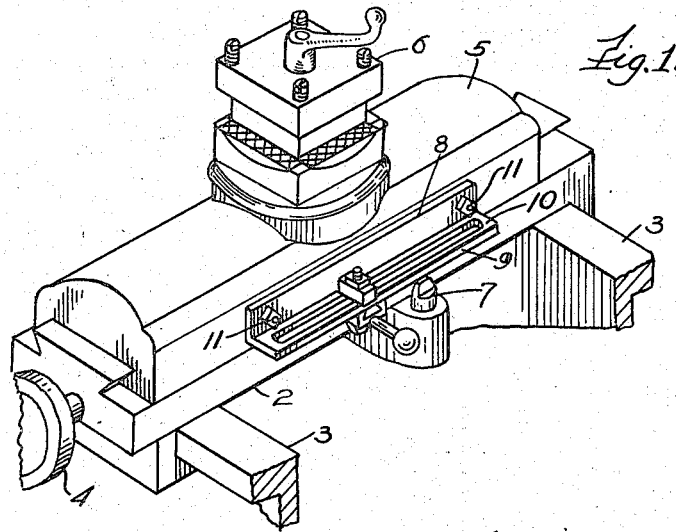
Fig. 1.
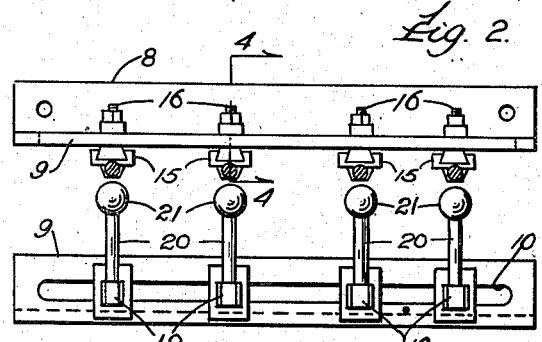
Fig. 2.
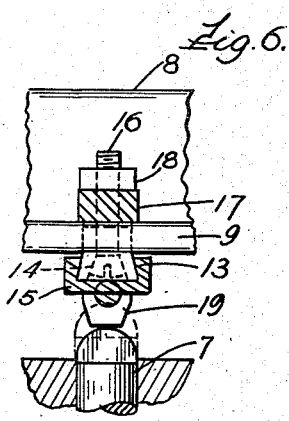
Fig. 6.
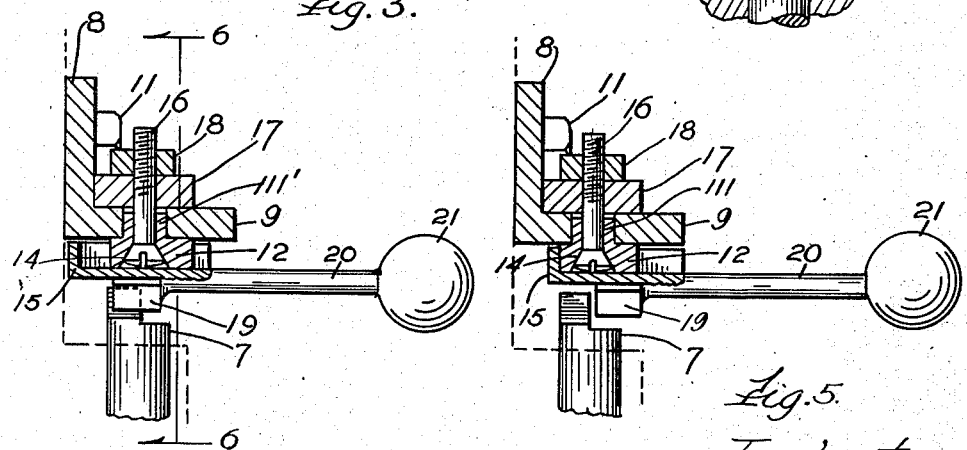
Fig. 3.
Fig. 4.
Fig. 5.
Inventor:
Louis Paul Takac, Jr.
by H. J. Sanders
Attorney.

Patented Oct. 2, 1945

2,386,014

UNITED STATES PATENT OFFICE 2,386,014

ADJUSTABLE DOG STOP RELEASE FOR TURRET LATHES

Louis Paul Takac, Jr., Chicago, Ill.

Application May 25, 1944, Serial No. 537,321

3 Claims. (Cl. 29—65)

This invention relates to attachments for turret lathes and the like and more particularly to an improvement in an adjustable dog stop release which in the present instance is shown in connection with a turret lathe. The turret lathe is suitable for any job in which a number of operations are to be performed on the work and each of which requires a tool of different shape or cutting edge. Each tool is held on a different side of a turret which is mounted on a carriage and which, after the carriage returns from one operation on the work, can be swung with a new tool into place for the next operation.

However, when the carriage on the turret lathe is set up for a certain clip on the cross-feed hand wheel it will function only on that particular clip. In the event that the operator desires to pass this particular clip and go to the next, using a new tool, it is ordinarily necessary to hold the cross-feed engagement lever until the cross-feed hand wheel rides through the set up on the cross slide carriage unit. It is the purpose of the instant invention to make this unnecessary. The carriage is now set up to disengage the cross-feed engagement lever as usual at the proper time or point and if more than one clip is used, there are six clips on the graduated dial on the cross-feed hand wheel as a rule, the cross-feed hand wheel will not disengage after engagement with any one clip but will travel successively from one to the next or in the order of the set up.

A further object of the invention is to provide an adjustable dog stop release adapted for ready application to the compound or slide carriage of a turret lathe, or the like, that is simple in construction, of few parts, positive and efficient in operation, that is readily set up to conform to the clip set up and that is durable in construction and not likely to get out of order. With the foregoing and other objects in view the invention consists in the combination and arrangement of parts to be hereinafter fully described, pointed out in the claims and illustrated in the accompanying drawing which forms a part of this patent and in which—

Fig. 1 is a view in elevational perspective of a portion of a turret lathe illustrating the application of the instant attachment.

Fig. 2 is a view in front elevation of the attachment per se, showing several adjustable units in use, the hand rods being shown in section.

Fig. 3 is an inverted plan view of the attachment shown in Fig. 2.

Fig. 4 is a vertical cross sectional view through Fig. 2 on the line 4—4, enlarged, the hand lever being shown in inner or operative position.

Fig. 5 is a view similar to Fig. 4 but with the control lever in an altered or outer inoperative position, and, Fig. 6 is a vertical sectional view through Fig. 4 on the line 6—6.

Like reference characters denote corresponding parts throughout the several views.

The reference numeral 1 denotes the compound of a turret lathe consisting of the carriage 2 arranged upon the ways 3 and provided with the cross-feed hand wheel 4 and slide 5 provided with tool post 6, said carriage 2 carrying the usual spring-pressed plunger 7 yieldingly retained in raised position to keep the tool post engaged but which is depressed in conventional manner when it is desired to disengage the tool post.

To provide means for automatically disengaging the tool post to position a new tool for operation upon the work, or to position two or more tools successively or according to the carriage set up I provide an elongated frame, right angled in cross section, having a vertically disposed side portion 8 and a horizontally disposed portion 9, the latter being formed with a longitudinally extending slot 10 extending from end to end, the side 8 being secured by fastening means 11 to one side wall of the slide 5 with the portion 9 extending outwardly therefrom and from the lower edge of the side portion 8.

Slidably disposed in the said slot 10 is the stem 111 of an inverted T-shaped shoe 12 the side faces 13, 14 of which are beveled for supporting and sliding engagement with the trough-shaped piece 15 closed at its inner end, the inner faces of the side walls of which are beveled complementary to said shoe faces to form a mortise-tenon fit, said shoe being retained in position by a screw 16 the head of which is countersunk in said piece, the stem of said screw extending through said stem 111 and through a block 17 slidably disposed upon the slotted portion of said frame, said screw being provided with the nut 18 for releasably locking said block in adjusted position upon said frame.

Secured to or made integral with the lower face of the base of the piece 15 is a stub-finger 19 the lateral faces of which are beveled downwardly, said stub-finger being disposed at substantially the longitudinal central portion of said piece and extending axially of same, said piece 15 being provided also upon its lowermost face with a handle 20 extending outwardly away from the side portion 8 and provided terminally with a head or hand grip 21 to facilitate movement of said piece 15 relative to the shoe 12.

To assemble this adjustable dog stop release the piece 15 is applied to the shoe 12 and the stem 111 with screw 16 inserted in the slot 10, the block 17 and nut 18 then being applied and it is ready for adjustment longitudinally of the slot in a position to correspond with the clip on the graduated dial on the cross-feed hand wheel. When several clips are used several sliding units corresponding to the one described are provided upon the frame 8, 9 as shown in Figs. 2 and 3 in positions corresponding to said clips. It will be noted that the piece 15 is adjustable to two important positions.

An inner position is shown in Fig. 4 wherein the stub-finger 19 moves with the frame 8, 9, being locked by nut 18 in adjusted position, along a path in which is disposed the plunger 7 for operating contact therewith and when this takes place said plunger is depressed and the tool post released, as shown in Fig. 6. When, however, contact with said plunger 7 is not desired the piece 15 is moved by handle 20, 21 to outer position to travel a path free from said plunger 7, as shown in Fig. 5. Obviously the several units carried by a frame 8, 9 may be disposed in operative or inoperative positions, just described, to release or ignore the tool post as desired.

While I have described in considerable detail the illustrated embodiment of my invention it will be understood by those skilled in the art that variations and modifications may be made without departing from the spirit of the invention. I do not therefore desire to be limited to the form shown and described, but claim as my invention all embodiments thereof falling within the scope of the appended claims.

What is claimed is:

1. As an article of manufacture, an elongated frame right-angled in cross section, one side of said frame having therein an elongated slot, an inverted T-shaped shoe having its stem slidably disposed in said slot and its crosshead therebeneath, a screw having its head imbedded in said crosshead and its shank extending through said stem, a block upon said screw received upon said slotted frame portion, a nut for said screw, a trough-shaped piece slidably engaging the crosshead of said shoe immediately beneath said slotted frame portion, a stub-finger carried by said piece, and a handle for said piece.

2. In an adjustable dog stop release for turret lathes and the like having a control plunger, an elongated frame substantially right-angled in cross section, one side of said frame being secured to the lathe compound, the other side of said frame being slotted longitudinally, its slot being positioned above the lathe plunger, a shoe having one portion slidably disposed in said slot with a portion disposed immediately therebeneath, a screw extending through said shoe and slot and thereabove, a block upon said screw slidable upon said frame, a nut for said screw, a trough-shaped piece slidably carried by said shoe, a stub-finger carried by said piece upon its lower face, and a handle for said piece to dispose said stub-finger in and out of line with said lathe plunger.

3. In an adjustable dog stop release for turret lathes having a control plunger, a frame secured to the lathe compound and extending outwardly beyond the plunger and above same, said frame being slotted in line with said plunger, a shoe slidably received in said slot with a portion immediately therebeneath, a screw extending through said shoe and slot and thereabove, a nut for said screw, a piece slidably carried by said shoe immediately beneath said frame, a stub-finger carried by said piece for movement therebeneath and for contact with said plunger in one position of said piece, and a handle for adjusting said piece.

LOUIS PAUL TAKAC, JR.